(12) United States Patent
Calvano

(10) Patent No.: US 10,891,216 B2
(45) Date of Patent: Jan. 12, 2021

(54) PARALLEL DATA FLOW ANALYSIS PROCESSING TO STAGE AUTOMATED VULNERABILITY RESEARCH

(71) Applicant: Raytheon Company, Waltham, MA (US)

(72) Inventor: Andrew Calvano, Draper, UT (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/228,963

(22) Filed: Dec. 21, 2018

(65) Prior Publication Data
US 2020/0201742 A1 Jun. 25, 2020

(51) Int. Cl.
| | |
|---|---|
| G06F 9/44 | (2018.01) |
| G06F 11/36 | (2006.01) |
| G06F 16/901 | (2019.01) |
| G06F 9/30 | (2018.01) |

(52) U.S. Cl.
CPC ........ *G06F 11/3636* (2013.01); *G06F 9/3005* (2013.01); *G06F 11/3616* (2013.01); *G06F 11/3668* (2013.01); *G06F 16/9024* (2019.01)

(58) Field of Classification Search
CPC .............. G06F 9/3005; G06F 11/3616; G06F 11/3636; G06F 11/3668; G06F 16/9024
USPC ................................... 717/124–133, 154–157
See application file for complete search history.

(56) References Cited

U.S. PATENT DOCUMENTS

| | | | | |
|---|---|---|---|---|
| 5,889,999 | A * | 3/1999 | Breternitz, Jr. | ......... G06F 8/445 |
| | | | | 712/201 |
| 9,411,558 | B2 * | 8/2016 | Hutchison | ............... G06F 8/451 |
| 10,255,108 | B2 * | 4/2019 | Dillenberger | ......... G06F 9/5038 |

OTHER PUBLICATIONS

Xu, "POMP: Postmortem Program Analysis with Hardware-Enhanced Post-Crash Artifacts", Aug. 2017, 26th USENIX Security Symposium, USENIX Association, pp. 17-32 (Year: 2017).*
Fabian Yamaguchi, "Pattern-Based Vulnerability Discovery", 2015, retrieved from https://pdfs.semanticscholar.org/, 151 pages. (Year: 2015).*

* cited by examiner

*Primary Examiner* — Ted T. Vo
(74) *Attorney, Agent, or Firm* — Daly, Crowley, Mofford & Durkee, LLP

(57) ABSTRACT

A method for data flow analysis, comprising: obtaining, by a processing circuitry, an execution trace of a software program; dividing, by the processing circuitry, the execution trace into a plurality of sections; generating a plurality of definition-and-usage chains, at least some of the definition-and-usage chains being generated by different processors, at least some of the definition-and-usage chains being generated based on different sections of the execution trace, at least two of the definition-and-usage chains being generated in parallel with one another; combining, by the processing circuitry, the plurality of definition-and-usage chains to produce a data flow graph, the definition-and-usage chains being combined based on information provided by at least one of the processors that are used to generate the definition-and-usage chains, the information indicating one or more unresolved memory locations that are accessed by respective operations corresponding to one or more incomplete usage nodes in the definition-and-usage chains.

14 Claims, 8 Drawing Sheets

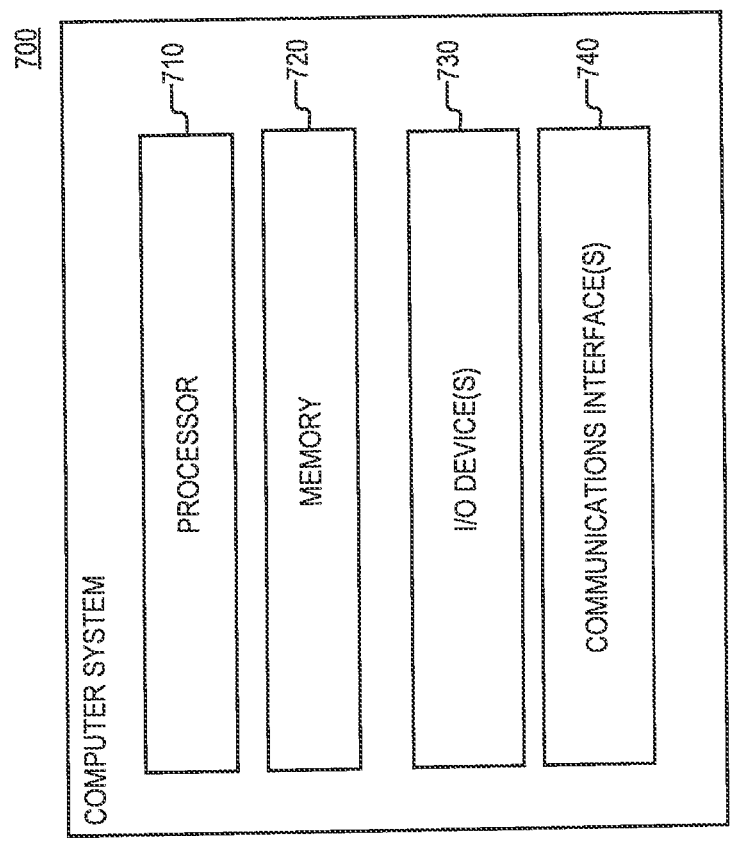

PARALLEL DATA FLOW ANALYSIS PROCESSING TO STAGE AUTOMATED VULNERABILITY RESEARCH

BACKGROUND

Data flow analysis involves examining a data flow graph that is generated for a software program to determine the state of the software program during different stages of an execution of the software program. The data flow graph for a software program may include a first set of nodes that correspond to the definitions of different variables in the program, a second set of nodes that correspond to operations that are performed by the program based on the definitions, and a set of edges, wherein each edge connects one of the nodes in the first set to a respective one of the nodes in the second set. The data flow graph for a software program may be generated by processing a trace log of an execution of the software program. In some respects, software programs that are executed using multiple processors may have execution trace logs that are very large in size. Processing such trace logs to generate data flow graphs, by using known data flow analysis techniques, may be resource-intensive and time consuming. Accordingly, the need exists for new data flow analysis techniques that are able to generate data flow graphs efficiently.

SUMMARY

According to aspects of the disclosure, a method is provided for data flow analysis, comprising: obtaining, by a processing circuitry, an execution trace of a software program; dividing, by the processing circuitry, the execution trace into a plurality of sections, each section identifying a sequence of instructions of the software program; generating a plurality of definition-and-usage chains, at least some of the definition-and-usage chains being generated by different processors, at least some of the definition-and-usage chains being generated based on different sections of the execution trace, at least two of the definition-and-usage chains being generated in parallel with one another; combining, by the processing circuitry, the plurality of definition-and-usage chains to produce a data flow graph, the definition-and-usage chains being combined based on information provided by at least one of the processors that are used to generate the definition-and-usage chains, the information indicating one or more unresolved memory locations that are accessed by respective operations corresponding to one or more incomplete usage nodes in the definition-and-usage chains; and providing, by the processing circuitry, the data flow graph for further use in detecting vulnerabilities in the software program.

According to aspects of the disclosure, a system is provided comprising: a memory; and a processing circuitry operatively coupled to the memory, the processing circuitry being configured to perform the operations of: obtaining an execution trace of a software program; dividing the execution trace into a plurality of sections, each section identifying a sequence of instructions of the software program; generating a plurality of definition-and-usage chains, at least some of the definition-and-usage chains being generated by a different processors, at least some of the definition-and-usage chains being generated based on different sections of the execution trace, at least two of the definition-and-usage chains being generated in parallel with one another; combining the plurality of definition-and-usage chains to produce a data flow graph, the definition-and-usage chains being combined based on information provided by at least one of the processors that are used to generate the definition-and-usage chains, the information indicating one or more unresolved memory locations that are accessed by respective operations corresponding to one or more incomplete usage nodes in the definition-and-usage chains; and providing the data flow graph or further use in detecting vulnerabilities in the software program.

According to aspects of the disclosure, a non-transitory computer-readable medium is provided that stores one or more processor-executable instructions, which when executed by at least one processor cause the at least one processor to perform the operations of: obtaining an execution trace of a software program; dividing the execution trace into a plurality of sections, each section identifying a sequence of instructions of the software program; generating a plurality of definition-and-usage chains, at least some of the definition-and-usage chains being generated by different processors, at least some of the definition-and-usage chains being generated based on-different-sections of the execution trace, at least two of the definition-and-usage chains being generated in parallel with one another; combining he plurality of definition-and-usage chains to produce a data flow graph, the definition-and-usage chains being combined based on information provided by at least one of the processors that are used to generate the definition-and-usage chains, the information indicating one or more unresolved memory locations that are accessed by respective operations corresponding to one or more incomplete usage nodes in the definition-and-usage chains; and providing the data flow graph for further use in detecting vulnerabilities in the software program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 7 is a diagram of an example of a computing system, according to aspects of the disclosure.

DETAILED DESCRIPTION

Figure 1C:
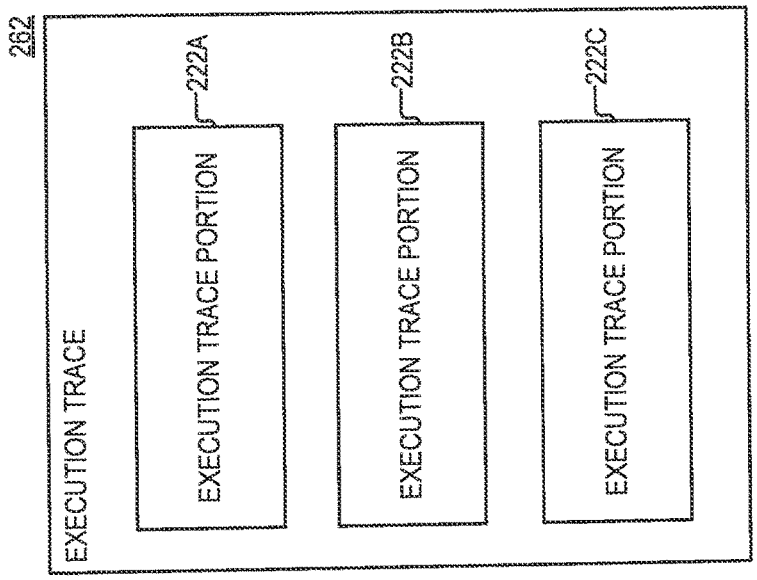
FIG. 1C is a diagram of an example of an execution trace, according to aspects of the disclosure.
Figure 1B:
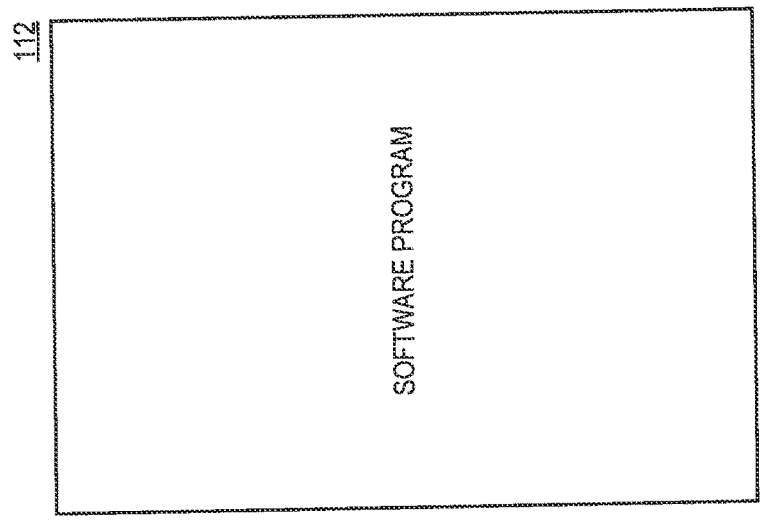
FIG. 1B is a diagram of an example of a software program, according to aspects of the disclosure.
Figure 1A:
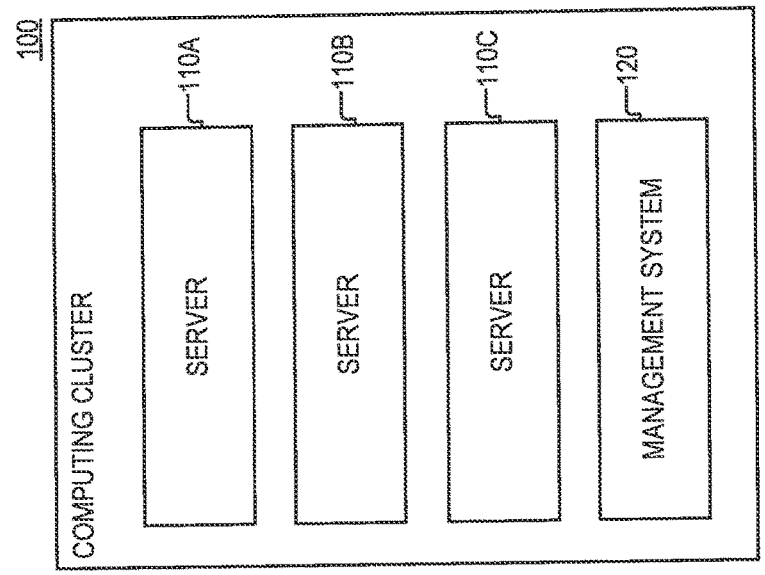
FIG. 1A is a block diagram of an example of a computing cluster, according to aspects of the disclosure.

FIG. 1A, is a diagram of an example of a computing cluster 100, according to aspects of the disclosure: The computing cluster may include a plurality of servers 110 and a management system 120. The servers 110 and the management system 120 may be connected to one another via a communications backbone (not shown). The communications backbone may include an InfiniBand network, a TCP/IP network, the Internet, a local area network (LAN), a wide area network (WAN), and/or any other suitable type of communications network. As is further discussed below, the computing cluster 100 is configured to execute a software program. Although in the present example, the cluster 100 includes only three servers, it will be understood that alternative implementations are possible in which the computing cluster includes any number of servers (e.g., 10, 100, 1000, etc.). Stated succinctly, the present disclosure is not limited to any specific implementation of the computing cluster.

FIG. 1B shows an example of a software program 112. In some implementations, the software program may be executed by one or more of the servers 110A, Additionally, or alternatively, in some implementations, the software program may be executed on another system. According to the present disclosure, the software program 112 may include any suitable program that can be analyzed using data flow graphs. In this regard, it will be understood that the present disclosure is not limited to any specific type of software program.

FIG. 1C shows an example of an execution trace 262 for the software program 112. The execution trace 262 may identify a list of execution trace entries containing the bytes (or other identifiers) of any executed instruction of the software program 112, and the values of any concrete memory addresses accessed by the instruction. In embodiments, each of the execution trace entries may identify one or more of: (i) an instruction in the software program 112 that is executed, (ii) one or more memory addresses that are accessed by the instruction to retrieve arguments (e.g., input data) for the instruction, and (iii) one or more memory addresses that are accessed by the instruction to store data (e.g., output data) that is generated by the instruction. The execution trace 262 may include a plurality of execution trace sections 222. Each section 222 may identify a set of contiguous instructions of the software program 112. Because the sections 222 are contiguous, in order of execution, any of the sections 222 may identify only instructions that are executed before and/or after any of the instructions identified in the remaining sections 222.

According to the present example, the execution trace 262 is in a machine code format, and the instructions identified in the execution trace 262 are machine code instructions. However, it will be understood that alternative implementations are possible in which any other suitable format may be used instead. According to the present disclosure, the term "memory location" may refer to any suitable type of memory location, such as a processor register, a block in RAM, a location in permanent storage, etc. According to the present example, the execution trace 262 identifies all locations in RAM and all processor registers that are accessed by the instructions in the software program 112. However, alternative implementations are possible, in which a subset of the memory locations accessed by the instructions of the software program 112 is identified by the execution trace 262. Stated succinctly, the present disclosure is not limited to any specific type of memory location being identified in the execution trace.

Figure 2B:
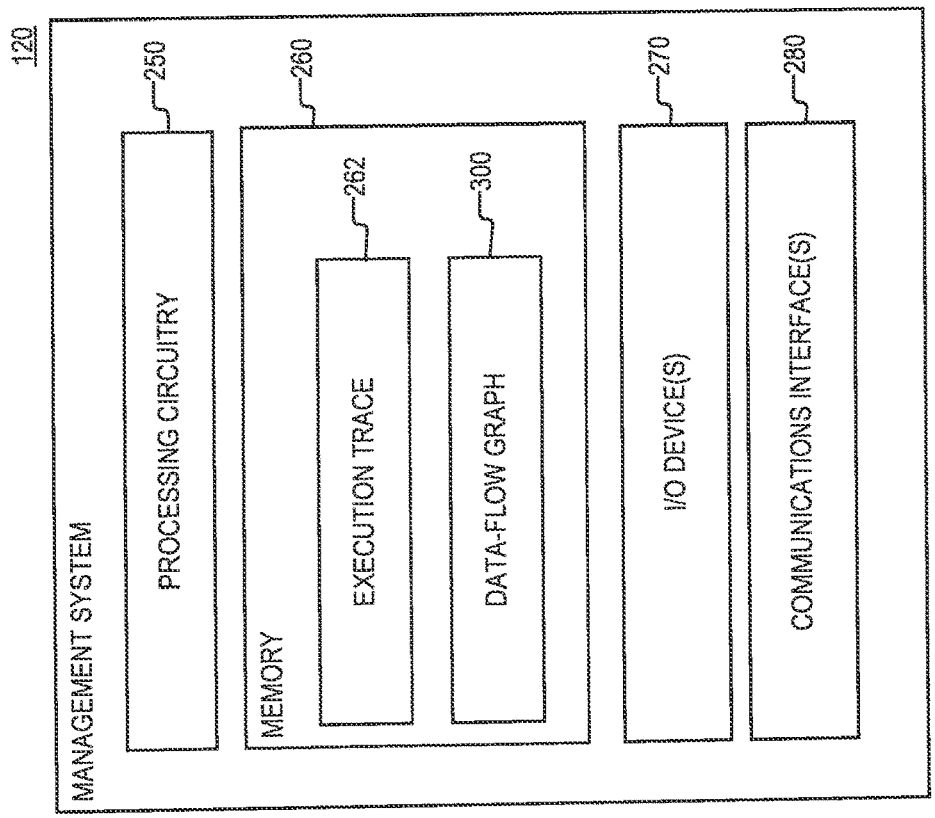
FIG. 2B is a block diagram of an example of a management system in the computing cluster of FIG. 1, according to aspects of the disclosure.
Figure 2A:
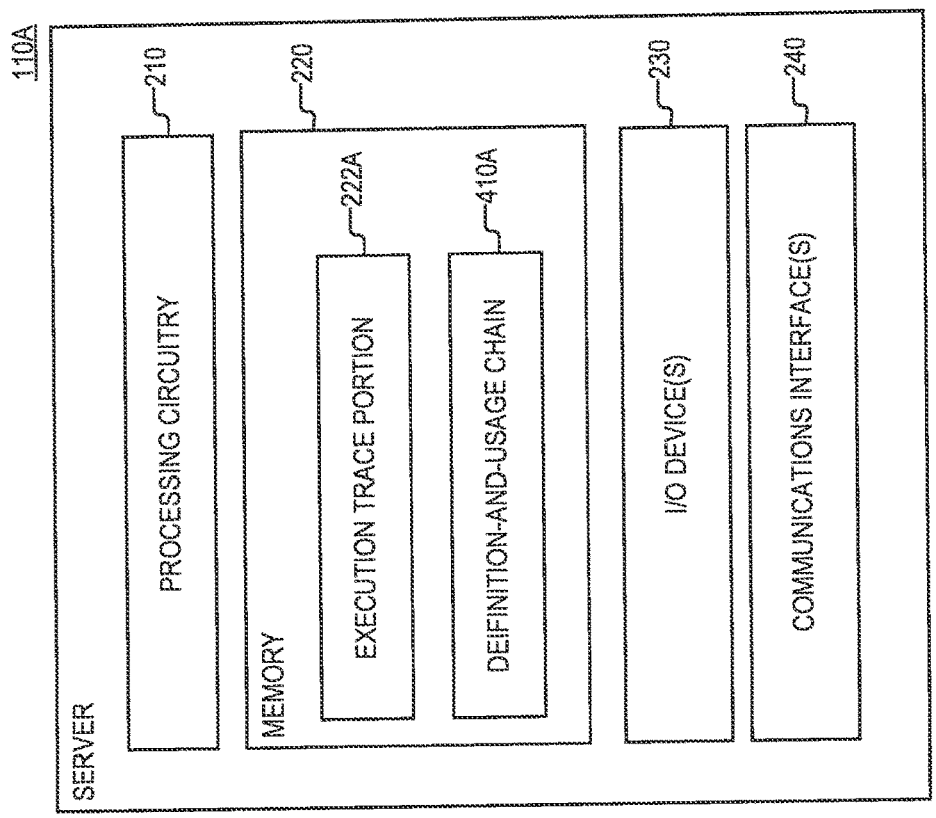
FIG. 2A is a block diagram of an example of a server in the computing cluster of FIG. 1, according to aspects of the disclosure.

FIG. 2A illustrates the internal configuration of the server 110A, in accordance with one example. As illustrated, the server 110A may include a processing circuitry 210, a memory 220, I/O device(s) 230, and communications interface(s) 240 that are operatively coupled to one another. The processing circuitry 210 may include any of one or more general-purpose processors (e.g., x86 processors, RISC processors, ARM based processors, etc.), one or more Field Programmable Gate Arrays (FPGAs), one or more application specific circuits (ASICs), and/or any other suitable type of processing circuitry. The memory 220 may include any suitable type of volatile and/or non-volatile memory. In some implementations, the memory 220 may include one or more of a random-access memory (RAM), a dynamic random memory (DRAM), a flash memory, a hard drive (HD), a solid-state drive (SSD), a network accessible storage (NAS), and or any other suitable type of memory device. The 110 device(s) 230 may include any suitable type of input and/or output device, such as one or more mice, one or more keyboards, one or more microphones, or one or more display screens, for example. The communications interface(s) 240 may include any suitable type of communications interface, such as one or more Ethernet adapters, one or more Wi-Fi adapters e.g., 802.11 adapters), and one or more Long-Term Evolution (LTE) adapters, for example.

In operation, the processing circuitry 210 may be operable to receive the execution trace section 222A from the management system 120 and generate a definition-and-usage chain 410A. Afterwards, the processing circuitry 210 may provide the definition-and-usage chain 410A to the management system 120. Although FIG. 2A shows an example of the server 110A, it will be understood that each of the remaining servers 110 may have the same or similar structure. In this regard, in some implementations, each of the servers 110 may be configured to: (i) receive a respective execution trace section, (ii) generate a definition-usage chain, and (iii) provide the definition-and-usage chain 410 to the management system 120.

FIG. 2B illustrates the internal configuration of the management system 120, in accordance with one example. As illustrated, the management system 120 may include a processing circuitry 250, a memory 260, I/O device(s) 270, and communications interface(s) 280 that are operatively coupled to one another. The processing circuitry 250 may include any of one or more general-purpose processors (e.g., x86 processors, RISC processors, ARM based processors, etc.), one or more Field Programmable Gate Arrays (FP- GAs), one or more application specific circuits (ASICs), and/or any other suitable type of processing circuitry. The memory 260 may include any suitable type of volatile and/or non-volatile memory. In some implementations, the memory 260 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 270 may include any suitable type of input and/or output device, such as one or more mice, one or more keyboards, one or more microphones, or one more display screens, for example. The communications interface(s) 280 may include any suitable type of communications interface, such as one or more Ethernet adapters, one or more Wi-Fi adapters (e.g., 802.10 adapters), and one or more Long-Term Evolution (LTE) adapters, for example.

In some implementations, the processing circuitry 250 may be configured to divide the execution trace 262 in as many sections as there are processors that are available for the generation of definition-and-usage chains, and provide each of the sections to a different one of the available processors. Upon receiving its respective trace section 222, each of the processors may produce one or more definition-and-usage chains 410 based on the received trace section. In the present example, the each of the servers 110 has one processor that is available for the generation of definition-and-usage chains. For this reason, the execution trace 262 is divided into three sections 222 (see FIG. 1C), and each of the execution trace sections 222 is provided to a different one of the servers 110A-C. However, if one of the servers 110 were to have multiple processors that are available for the generation of definition-and-usage chains, multiple execution trace sections 222 may be provided to that server.

Figure 3:
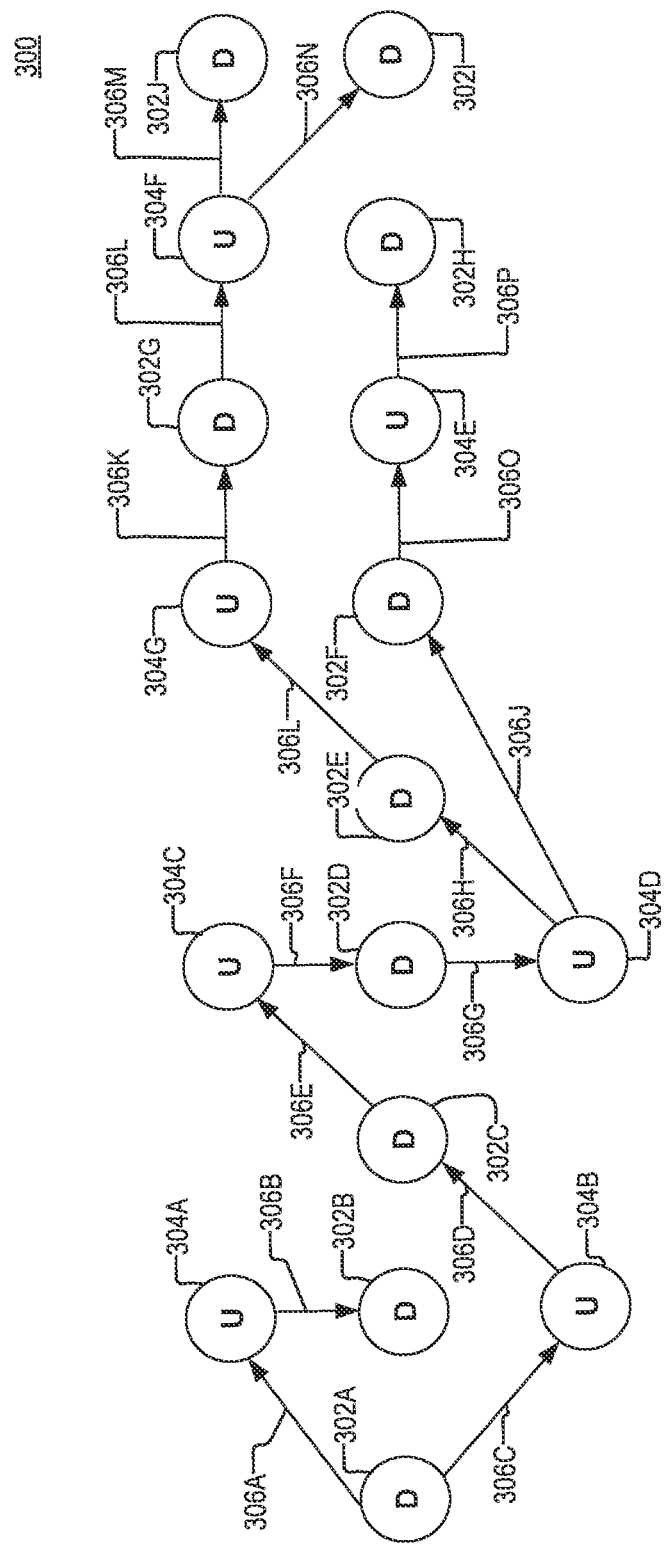
FIG. 3 is a diagram of an example of a data flow graph for a software program that is executed by the computing cluster of FIG. 1, according to aspects of the disclosure.

The processing circuitry 250 may be further configured to receive a plurality of definition and usage chains 410 from the servers 110, and combine the received definition-and-usage chains 410 to produce a data flow graph 300 (shown in FIG. 3). In some implementations, the graph 300 may be generated in accordance with the process 600, which is discussed further below with respect to FIG. 6, After the graph 300 is generated, it may be stored in the memory 260 for further processing.

The processing circuitry 250 may be further configured to retrieve the graph 300 from memory 260 and perform data flow analysis of the software program 112 based on the graph 300, As a result of the data flow analysis, the processing circuitry 250 may identify one or more vulnerabilities in the software using techniques known in the art. For example, the processing circuitry 250 may be arranged to use the data flow graph to detect unauthorized accesses of data that is stored at predetermined memory locations or registers. As another example, the processing circuitry 250 may identify the memory and/or register from where unauthorized data is introduced into the software program. It will be understood that the present disclosure is not limited to any specific technique for analyzing data flow graphs of software programs in order to identify vulnerabilities, One such method of discovering vulnerabilities includes performing a taint analysis of untrusted data sources over the data flow graph and tracking these to vulnerability-inducing sinks. Such vulnerability-inducing sinks include registers used as pointers in load or store instructions which provide opportunity for exploit controlled memory access. Other applications include a taint analysis performed over the data flow graph sourced from sensitive memory locations, such as those containing cryptographically sensitive data, and tracking taint to sinks that send the data outside of the application.

Although in the example of FIGS. 1A-2B, the servers 110A-C and the management system 120 are configured to perform different functions, it will be understood that alternative implementations are possible in which one or more of the servers 110 are configured to perform the functions of the management system 120. Furthermore, it will be understood that alternative implementations are possible in which the management system 120 is configured to perform the functions of one or more of the servers 110. Stated succinctly, the present disclosure is not limited to the division of functions that is described with respect to FIGS. 1A-2B.

FIG. 3 is a diagram of an example of the data flow graph 300 in accordance with one particular implementation. The graph 300 may include a plurality of definition nodes 302A-I and a plurality of usage nodes 304A-F that are connected to one another via edges 306A-N. The term "definition," as used in context of the graph 300, refers to a value of a memory location that is used (e.g., accessed and/for generated) by the software program 112. The term "usage," as used in the context of the graph 300, refers to the use of a particular definition. Each definition node 302 in the graph 300 is associated with a definition that is stored in a corresponding memory location (e.g., a location in RAM or a memory register), and represents an operation that has stored the definition at the memory location. Each usage node 304 in the graph 300 is associated with a definition that is stored in a corresponding memory location (e.g., a location in RAM or a memory register), and represents an operation that has retrieved the definition from the memory location. Each edge 306 in the graph 300 connects: (i) a definition node 304 representing an operation that has stored a value at a memory location (e.g., a location in RAM or a processor register) and (ii) a usage node 304 representing an operation that has retrieved the same value from the memory location. Stated succinctly, the data flow edges 306, together with the definition nodes 302 and the usage nodes 304, may identify: (i) what data is accessed by different operations of the software program 112, and (ii) what data is generated by these operations. Throughout the disclosure, the terms "usage" and "operation" may be used interchangeably, as indicated by context. The operations referred to in the disclosure may include "addition operations," "subtraction operations," "XOR operations," and or any other operation that is performed when one or more machine code instructions (that are part of the software program 112) are executed.

In the example of FIG. 3, the definition nodes 302 represent all definitions that are generated by the software program 112 over the course of the program's execution, which are stored in the registers of the processor(s) executing the software program 112 as well as RAM used by the program. However, alternative implementations are possible in which only some of the definitions accessed by the software program 112 are represented by the definition nodes 302.

The data flow edges 306 may be directed edges. As noted above, each of the data flow edges 306 may represent a mapping between one of the definition nodes 302 and one of the usage nodes 304. Each of the data flow edges 306 may be created based on a respective program counter value. Each program counter value may mark the point in the execution trace 262 where a particular operation (e.g., usage) is executed and it may be used to link the operation to the last definition(s) of the register(s) or memory location (s) that are accessed by the operation. Accordingly, the data flow edges 306, which are produced based on the program counter values, may allow for the querying of specific memory locations (e.g., locations in RAM or processor registers) at any point in the execution trace 262. The definition node 302C is associated with a definition that is accessed (and used as an argument) by the operation of node 304C when the operation is executed; the definition node 302G is associated with a definition that is accessed (and used as an argument) by the operation of node 304E when the operation is executed; and the definition node 302F is associated with a definition that is accessed (and used as an argument) by the operation of node 304E when the operation is executed.

Figure 4A:
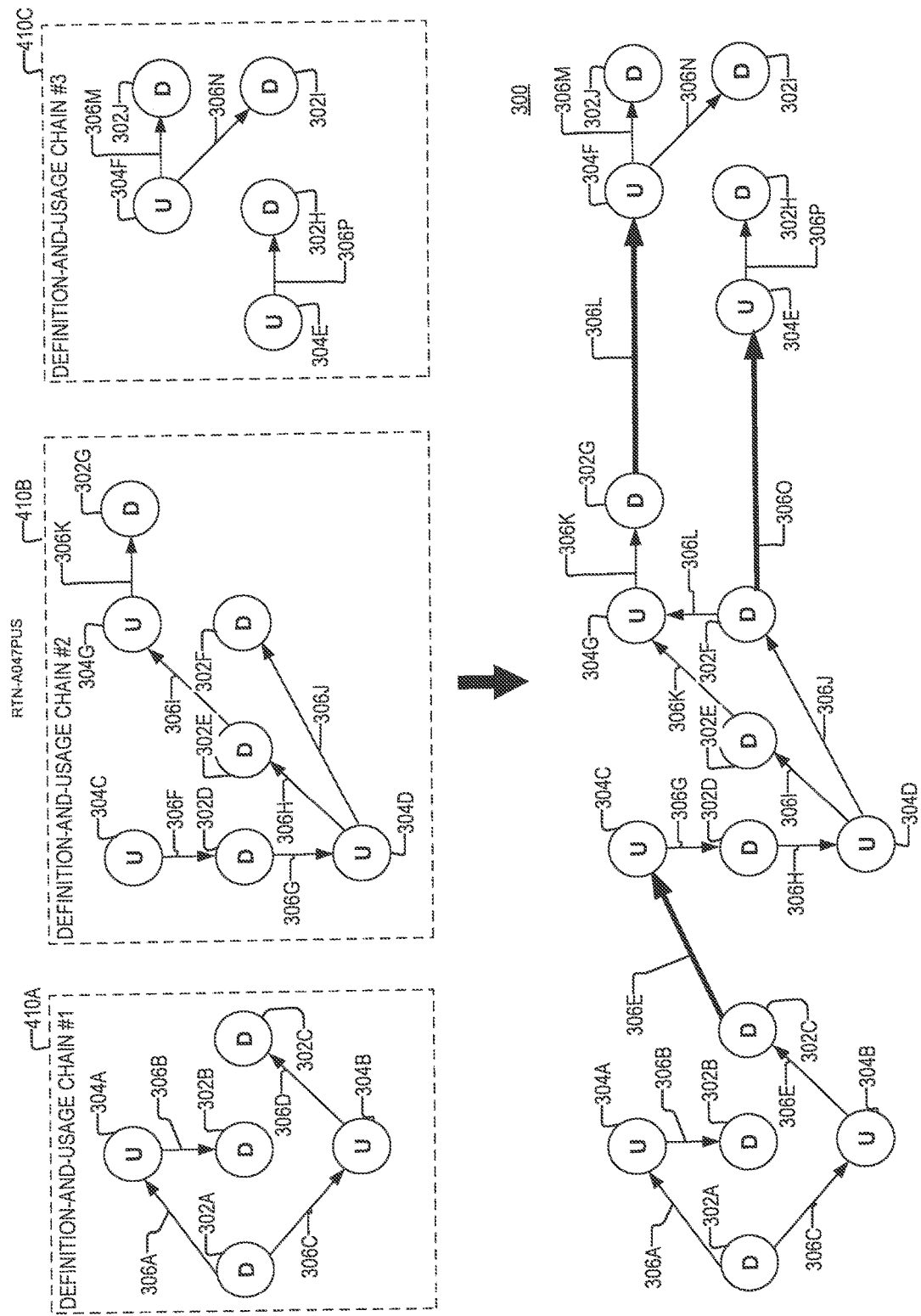
FIG. 4A is a diagram illustrating a process for generating the data flow-graph of FIG. 3, according to aspects of the disclosure.

FIG. 4A shows an example of a process for generating the graph 300. According to the process, definition-and-usage chains 410A, 410B, and 410C are generated in parallel with one another, and subsequently connected via cross-chain edges to yield the graph 300.

Generating the definition-and-usage chains 410 may include generating a plurality definition-and-usage chains 410 based on different respective trace sections 222. According to the example of FIG. 4A, definition-and-usage chain 410A is generated by the server 110A based on the execution trace section 222A. Definition-and-usage chain 410B is generated by the server 110B based on the trace section 222B. And definition-and-usage chain 410C is generated by the server 110O; based on the trace section 222C. In some implementations, the plurality of definition-and-usage chains may be generated by using a list of data flow rules, wherein each of the data flow rules is associated with a different type of instruction. A dataflow rule may be generated from an instruction specifying the data flow propagation from source operands to definition operands. In some implementations, the specified data flow propagation logic will be used to create definition and usage nodes as well as dataflow edges in the definition-and-usage chains. Each execution trace section may be scanned sequentially, and the list of data flow edges (in the definition-and-usage chain 410 that corresponds to the execution trace section) may be updated by applying the corresponding data flow rule for each instruction that is encountered along the scan.

Combining the definition-and-usage chains 410 to produce the graph 300 may include identifying incomplete usage nodes 304 in any of the definition-and-usage chains 410 and generating cross-chain edges that connect the incomplete usage nodes 304 to corresponding definition nodes 302. In the example of FIG. 4A, the usage nodes 304C, 304E, and 304F are incomplete, and data flow edges 306E, 306L, and 306O are cross-chain edges. Each of the cross-chain edges 306E, 306L, and 306O connects one of the incomplete nodes 304C, 304E, and 304F to a respective definition node 302 that is located in a different definition-and-usage chain 410 than the connected incomplete node.

According to the present disclosure, an "incomplete usage node" may refer to a usage node in a given definition-and-usage chain 410 that is not connected to all (or at least some) definition nodes that correspond to definitions accessed by the usage node's respective operation when this operation is executed. One example of an incomplete usage node is the usage node 304C. As discussed above, the operation corresponding to usage node 304C accesses the definition that is generated by the operation corresponding to the definition node 302C. However, because the definition node 302C and the usage node 304C are part of different definition-and-usage chains, they are not connected by a data flow edge when the definition-and-usage chains 410 are initially created. In this regard, when the definition-and-usage chains 410A and 410B are combined to produce the graph 300, a cross-chain edge 306E is generated that connects the definition node 302C and the usage node 304C.

Another example of an incomplete usage node is the usage node 304F. As discussed above, the operation corresponding to the node 304F accesses the definition that is generated by the operation corresponding to the definition node 302G. However, because the usage node 304F and the definition node 302G are part of different definition-and-usage chains, they are not connected by data flow edges when the definition-and-usage chains 410 are initially created. In this regard, when the definition-and-usage chains 410B and 410C are combined to produce the graph 300, the cross-chain edge 306L is generated to connect the definition node 302G to the usage node 304F.

Yet another example of an incomplete usage node is the usage node 304E. As discussed above, the operation corresponding to the node 304E accesses the definition that is generated by the operation corresponding to the definition node 302F. However, because the definition node 302F and the usage node 304E are part of different definition-and-usage chains, they are not connected by a data flow edge when the definition-a/id-usage chains 410 are initially created. In this regard, when the definition-acid-usage chains 410A and 410B are combined to produce the graph 300, the cross-chain edge 306O is generated that connects the definition node 302F and the usage node 304E.

Figure 4B:
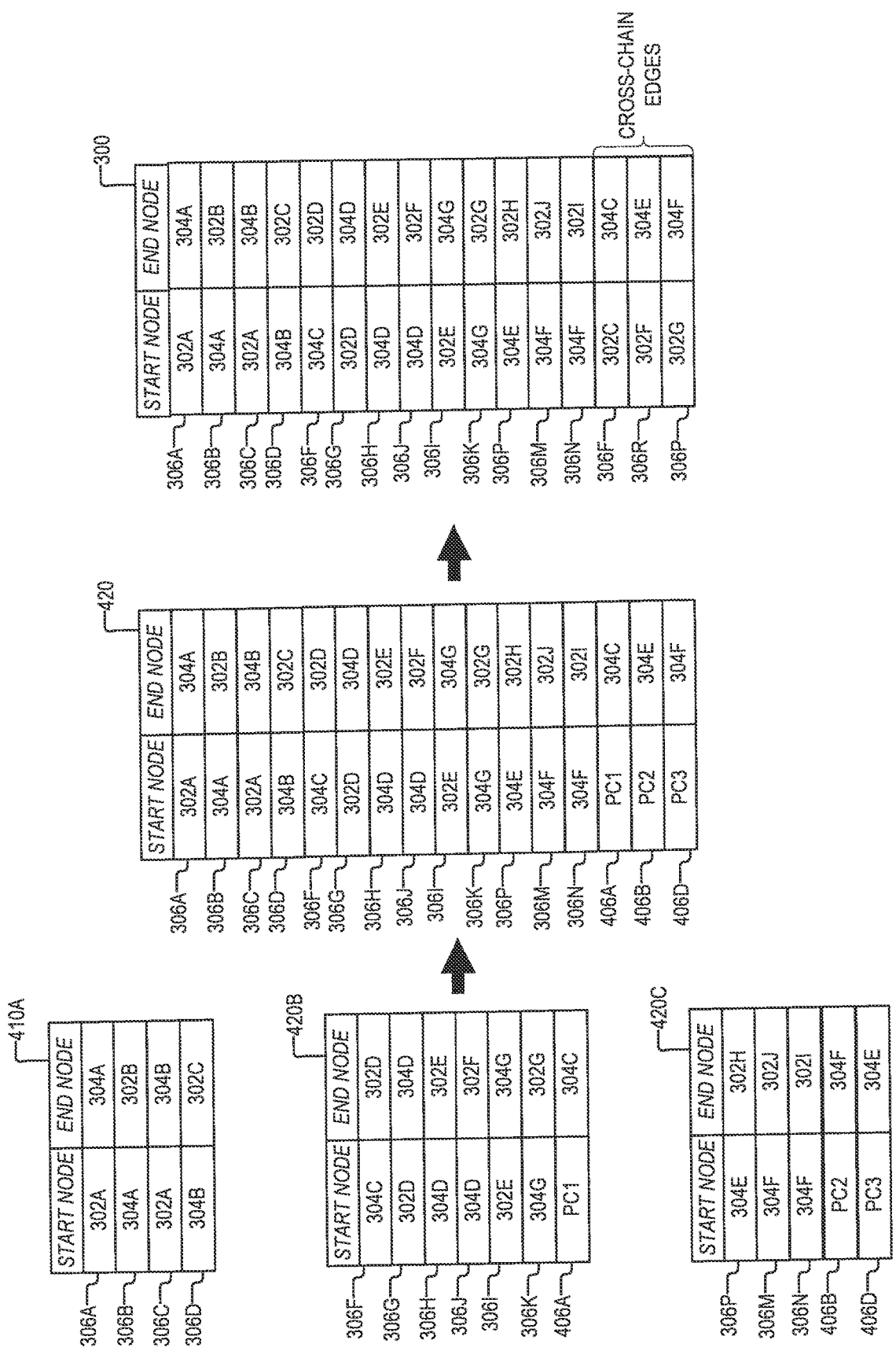
FIG. 4B is a diagram illustrating another process for generating the data flow-graph of FIG. 3, according to aspects of the disclosure.

FIG. 4B illustrates another example of a process for generating the graph 300. FIG. 4B illustrates that each of the definition-and-usage chains 410 may be represented by a table including a plurality of rows that represent different edges 306, as shown. In some implementations, each edge may be defined by using a starting node identifier and an end node identifier. Furthermore, any of the definition-and-usage chains 410 may include one or more entries 406 which identify incomplete usage nodes in the definition-and-usage chain 410. Each of the entries 406 may include a program counter identifier and identifier of an incomplete node associated with the program counter. In the example of FIG. 4B, each program counter is denoted by a label including the letters 'PC' followed by a number.

According to aspects of the disclosure, the program counter in any given entry 406 may identify an entry in the execution trace 262 (or any of the sections 222) where an operation corresponding to an incomplete node is executed, and which references an unresolved memory location. An entry in any given execution trace section 222 is considered to reference an unresolved memory location when: (i) the entry identifies an instruction which has retrieved a definition from the memory location, and (ii) the execution trace section 222 (which contains the entry) does not contain another entry that identifies the instruction which has generated the retrieved definition. In this regard, an unresolved memory location may be one which has been assigned a definition in a first section 222 of the execution trace 262, which has been subsequently retrieved by an operation in a second section 222 of the execution trace 262; the definition may correspond to a definition node; and the operation may correspond to a usage node that is not connected to the usage node (even though it ought to be), resulting in the usage node being incomplete when the definition-and-usage chains 410 are generated.

According to aspects of the disclosure, when the definition-and-usage chains 410 are produced, the presence of unresolved memory locations in any of the sections 222 may result in incomplete usage nodes being created in the trace section's respective definition-and-usage chain. This may be largely because each of the definition-and-usage chains 410 is created based on a separate section 222 of the execution trace 262, and some of the operations that have produced definitions accessed by entries of the section 222 may have been left out of the section 222 when the execution trace 262 is split into sections. When the definition-and-usage chains 410 are combined, incomplete memory locations may be resolved by scanning the remaining sections 222 (or the entire execution trace 262) to determine the last definition, which was stored in the unresolved memory location before an operation in the section 222 (which has accessed the undefined memory section to retrieve input data) is executed. After the last definition is identified, a cross-chain edge 306 may be created that connects the node 302 of the definition to the node 304 of the operation.

As illustrated, in FIG. 4B, generating the graph 300 may include transferring the contents of each of the definition-and-usage chains 410 into the an incomplete data flow graph 420, and then processing the incomplete data flow graph 420 to resolve any program counters (or other unresolved memory location identifiers) that are present in incomplete data flow graph 420, to yield the graph 300. In some implementations, resolving each program counter in the incomplete data flow graph 420 may include: (i) retrieving from the execution trace 262 (or one of the 222) a trace entry that is referenced by the program counter, (ii) determining an operation that is identified in the entry which has retrieved data from an unresolved memory location in the entry, (iii) identifying an unresolved memory location (e.g., a location in RAM or a processor register) that is accessed by the operation, (iv) identifying the last definition that was assigned to the memory location before the operation is executed, and (v) identifying a definition node corresponding to the last definition (e.g., a definition node representing the operation that has generated the last definition), and (vi) replacing the program counter, in the incomplete data flow graph 420, with an identifier of the definition node 302. As can be readily appreciated, replacing the program counter with the identifier of the definition node 302, effectively results in a cross-chain edge being added to the graph 300.

Figure 5:
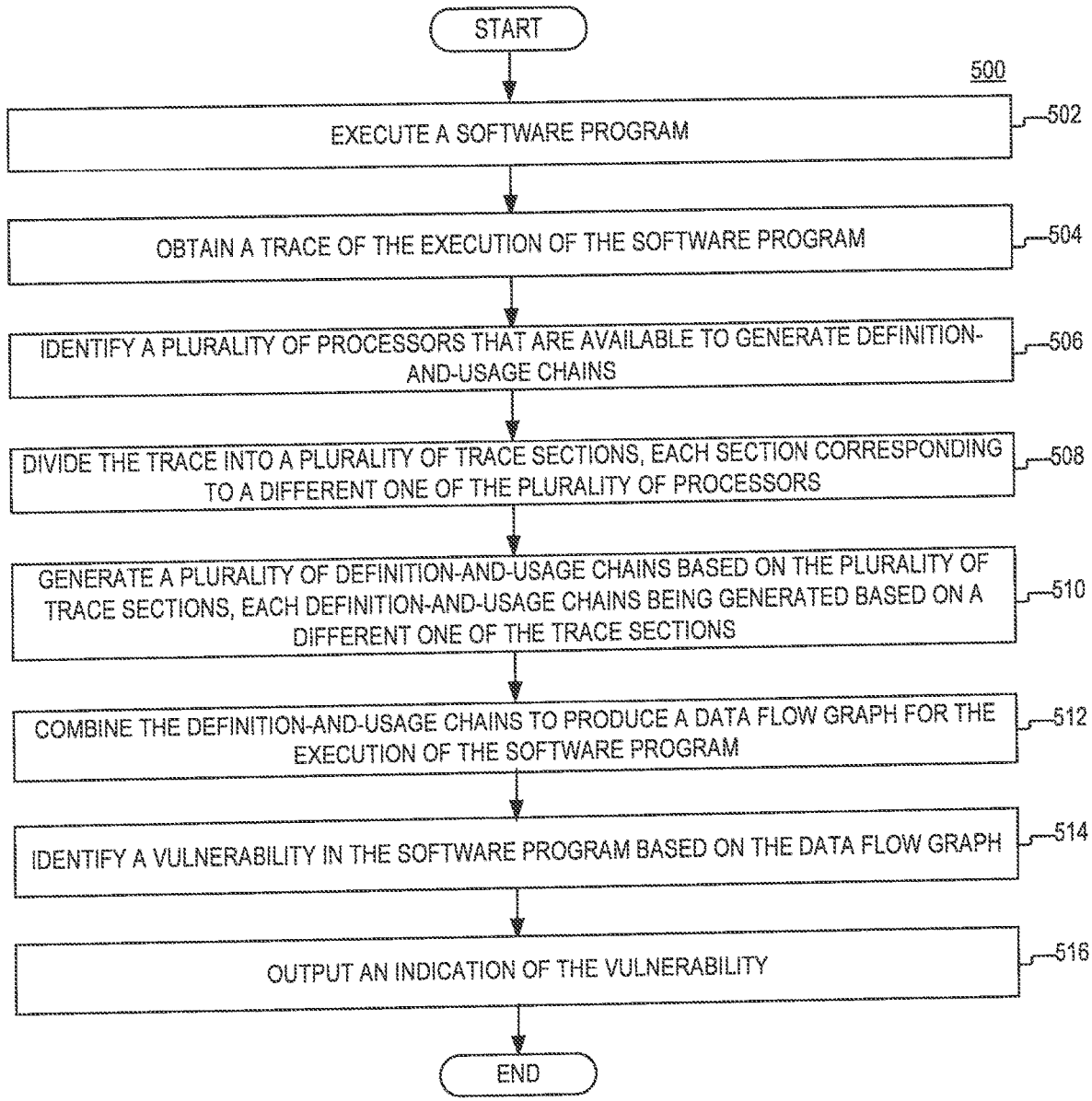
FIG. 5 is a flowchart of an example of a process, according to aspects of the disclosure.

FIG. 5 is a flowchart of an example of a process 500 for generating a data flow graph, according to aspects of the disclosure.

At step 502, a software program is executed. The software program may be any suitable type of software program. In some implementations, the software program may be the same or similar to the software program 112, which is discussed above with respect to FIG. 1.

At step 504, an execution trace is obtained for the execution of the software program. The execution trace may be the same or similar to the execution trace 262, which is discussed above with respect to FIG. 1C.

At step 506, a plurality of processors that are available to generate definition-and-usage chains is identified. In some implementations, the processors may be identified by retrieving from a memory a list or another data structure that includes identifiers corresponding to available processors.

At step 508, the execution trace is divided into a plurality of trace sections. In some implementations, the plurality may identify as many trace sections as there are available processors. The plurality of trace sections may be the same or similar to the plurality of execution trace sections 222, which is discussed above with respect to FIG. 1C.

At step 510, a plurality of definition-and-usage chains is generated based on the plurality of trace sections. Each of the definition-and-usage chains may be generated based on a different one of the plurality of trace sections by a different one of the plurality of processors. The plurality of definition-and-usage chains may be the same or similar to the plurality of definition-and-usage chains 410 (shown in FIGS. 4A-B). In some implementations, at least some of the definition-and-usage chains may, be generated concurrently. Although in the present example, the processors used to generate the definition-and-usage chains are not part of the processing circuitry executing the process 500, alternative implementations are possible in which one or more of the processors used to generate the definition-and-usage chains are part of the of the processing circuitry. In some implementations, generating the plurality of definition-and-usage chains may include providing to each of the processors a different one of the execution trace sections, and receiving from each of the processors a different respective definition-and-usage chain.

According to the present example, each (or at least one) of the generated definition-and-usage chains may include one or more definition nodes and one or more usage nodes. In some implementations, each (or at least one) of the definition-and-usage chains that are generated at step 510 may satisfy the following conditions: (i) each definition node in the definition-and-usage chain can have at most one incoming edge from a usage node and no incoming edges from other definition nodes, (ii) each usage node in the definition-and-usage chain can have one or more outgoing edges that lead to different definition nodes, but no outgoing edges that lead to other usage nodes, and (iii) any of the definition nodes and/or any of the usage nodes can be a terminal node in the definition-and-usage chain.

At step 512, the definition-and-usage chains generated at step 510 are combined to produce a data flow graph. The data flow graph may be the same or similar to the graph 300. The data flow graph may be combined in accordance with one or more of the processes discussed with respect to FIGS. 4A-B, and 6. After the data flow graph is produced, it can be provided for further use in detecting vulnerability in the software program. In some implementations, providing the data flow graph may include storing the graph in a memory for further use by other software (or hardware), or different portion of the software (and/or hardware) used to generate the data flow graph. Additionally or alternatively, providing the data flow graph may include transmitting the data flow graph to another device over a communications network.

Although in the present example each trace section is used as a basis for generating only one of the definition-and-usage chains, alternative implementations are possible in which each (or at least one) of the processors is configured to generate a plurality of definition-and-usage chains based on the trace section that is provided to the processor. In such instances, each of the plurality of definition-and-usage chains that are generated by a processor may be generated based on a different portion of the trace section that is provided to the processor. Additionally or alternatively, in some implementations, each of the plurality of definition-and-usage chains that are generated by the processor may include nodes (e.g., definition nodes and usage nodes) that are associated with a different set of (e.g., one or more) memory locations. For example, the nodes in one of the definition-and-usage chains may be associated only with the definition(s) of a first set of memory locations (e.g., locations in RAM and/or processor registers) and the nodes in another one of the definition-and-usage chains may be associated only with the definition(s) of a second set of memory locations (e.g., locations in RAM and/or processor registers). In some implementations, the data flow graph that is generated by combining different respective pluralities of definition-and-usage chains may be a disconnected directed acyclic graph, as definition-and-usage chains that are associated with different sets of memory locations may not connect with one another when the definition-and-usage chains are combined to produce the data flow graph.

At step 514, one or more vulnerabilities are identified in the software program based on the data flow graph. In some implementations, the vulnerabilities may be identified by performing data flow analysis on the data flow graph. In some implementations, the data flow analysis may reveal one or more unauthorized accesses of data that is stored at predetermined memory locations or registers, Additionally or alternatively, in some implementations, the data flow analysis may identify the memory location from where unauthorized data is introduced into the software program. The present disclosure is not limited to any specific technique for analysis of data flow graphs to identify software vulnerabilities.

At step 516, an indication of one or more of the vulnerabilities identified at step 514 is output for presentation to a user. In some implementations, outputting the indication of one or more vulnerabilities may include displaying text or an image on a display device, such as an LCD monitor. Additionally or alternatively, in some implementations, outputting the indication of one or more vulnerabilities may include outputting a sound using one or more speakers. Additionally or alternatively, in some implementations, outputting the indication of one or more vulnerabilities may include transmitting the indication to a client device over a communications network.

Figure 6:
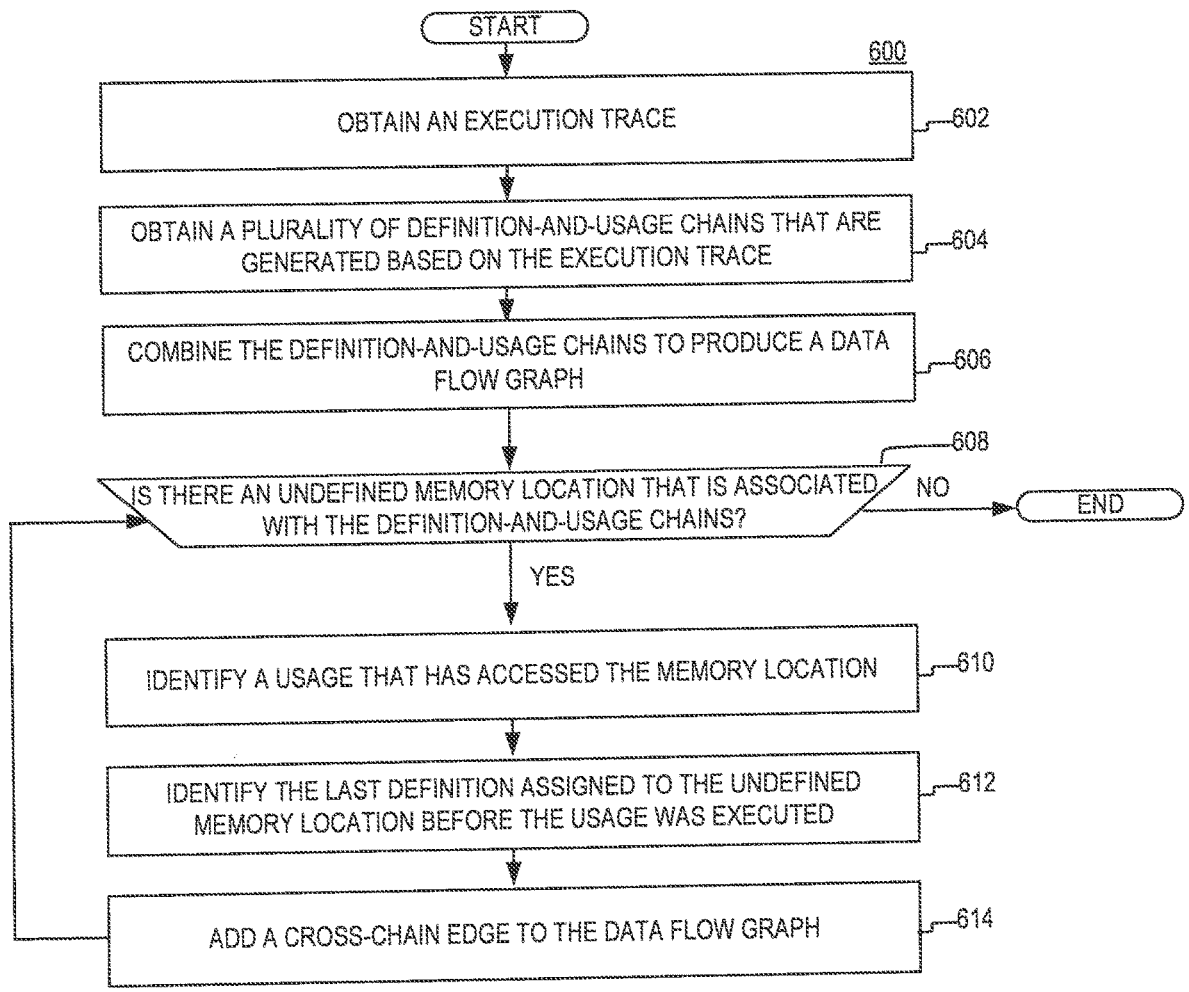
FIG. 6 is a flowchart of an example of a process associated with the process of FIG. 5, according to aspects of the disclosure.

FIG. 6 is a flowchart of an example of a process 600 for combining a plurality of definition-and-usage chains to produce a data flow graph.

At step 602, an execution trace used to generate the definition-and-usage chains is obtained. In some implementations, the execution trace may be the same or similar to the execution trace 262.

At step 604, a plurality of definition-and-usage chains is obtained. In some implementations, the obtained definition-and-usage chains may be the same or similar to the definition-and-usage chains 410 (shown in FIGS. 4A-B) or the definition-and-usage chains 710 (shown in FIG. 710).

At step 606, the definition-and-usage chains are combined to produce an incomplete data flow graph. In some implementations, the incomplete data flow graph may be the same or similar to the incomplete data flow graph 420 (shown in FIG. 4B).

At step 608, a determination is made if an unresolved memory location or processor register is present in the incomplete data flow graph. In some implementations, the unresolved memory location may be identified based on information (e.g., an unresolved memory location identifier) that is provided within the incomplete data flow graph. Additionally or alternatively, the unresolved memory location may be identified based on information (e.g., an unresolved memory location identifier) that is contained within the incomplete data flow graph. Additionally or alternatively, the unresolved memory location may be identified based on information (e.g., an unresolved memory location identifier) that is provided separately from the definition-and-usage chains anchor the incomplete data flow graph by the servers (or processors) that have generated the definition-and-usage chains. The information may identify the unresolved memory location either implicitly or explicitly. For example, in some implementations, the information may include a program counter value that identifies a particular entry (or point) in the execution trace 262. As another example, in some implementations, the information may include an address of a memory location (e.g., an address in RAM or an address of a processor register). If an unresolved memory location is determined to be present in the incomplete data flow graph, the process proceeds to step 610.

At step 610, an operation is identified that has accessed the unresolved memory location to retrieve data from. As discussed above, the operation may correspond to an incomplete usage node. In some implementations, the operation may be identified based on one or more of information that is provided within the incomplete data flow graph, information that is provided separately from the incomplete graph, or the execution trace used to generate the definition-and-usage chains that are obtained at step 602.

At step 612, the last definition assigned to the unresolved memory location before the operation is executed is identified. Determining, the last definition may include, identifying a plurality of definitions of the memory location based on the execution trace, identifying the respective timestamp of each definition, and, based on the timestamps of the definitions and the timestamp of the usage (which may be contained in the execution trace 262), identifying the last definition that was assigned to the unresolved memory location before the operation is executed.

At step 614, a cross-chain edge is added to the incomplete data flow graph based on the identified last definition. In some implementations, the cross-chain edge may connect a definition node to a usage node. In some implementations, the cross-chain edge may connect a first usage node to a second usage node. The first usage node may be one that corresponds to an operation that has produced the definition identified at step 612. The second usage node may be one that corresponds to the operation identified at step 610. After step 614, the process 600 returns to step 608, and steps 610-612 are repeated until all incomplete memory locations are resolved to produce a completed data flow graph. The completed data flow graph may be the same or similar to the graph 300.

FIG. 7 is a diagram of an example of a computer system 700, that can be used to execute any of the processes discussed throughout the disclosure. As illustrated, the computer system 800 may include a processor 710, a memory 720, 110 device(s) 730, and communications interface(s) 740 that are operatively coupled to one another. The processor 710 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 720 may include any suitable type of volatile and/or non-volatile memory. In some implementations, the memory 720 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 730 may include any suitable type of input and/or output device, such as one or more mice, one or more keyboards, one or more microphones, or one or more display screens, for example. The communications interface(s) 740 may include any suitable type of communications interface, such as one or more Ethernet adapters, one or more Wi-Fi adapters (e.g., 802.11 adapters), and one or more Long-Term Evolution (LTE) adapters, for example.

According to aspects of the disclosure, FIGS. 1-7 provide various examples of processes for generating a data flow graph for a software program based on an execution trace for the program. In these processes, different data flow-chains are generated in parallel and then combined to produce a complete data flow graph. In some respects, these processes are advantageous because for large execution traces, the processes may generate the data flow graph faster then when the graph is generated sequentially. The data flow graph may be used for debugging purposes, to identify various software vulnerabilities. In this regard, the processes discussed with respect to FIGS. 1-6 may be used on programming stations (that are operated by software developers) to shorten (or otherwise make more efficient) the development cycle (or maintenance cycle) of various types of software.

Furthermore, FIGS. 1-7 provide various examples of processes for generating a data flow graph in which different definition-and-usage chains are generated by different respective processors. Along with its respective definition-and-usage chain, each processor provides additional information that indicates one or more unresolved memory locations in any of the definition-and-usage chains. Although in the example of FIG. 4B, the additional information includes program counters (e.g., see entries 406 in FIG. 4B), the present disclosure is not limited thereto. In this regard, it will be understood that the additional information indicating one or more unresolved memory locations may include any suitable type of information that can be used to identify (e.g., in conjunction with the execution trace 262) at least one of: (i) one or more incomplete usage nodes in any of the definition-and-usage chains, or (ii) one or more unresolved memory locations. The additional information provided by each processor may be integrated into the definition-and-usage chain provided by the processor or it can be provided separately.

Although in the example of FIG. 4B, the definition-and-usage chains and the graph 300 are represented as tables, the present disclosure is not limited thereto. In this regard, it will be understood that the present disclosure is not limited to any specific representation of the definition-and-usage chains and the graph 300. In the example of FIG. 4B, placeholders for definition nodes or usage nodes (i.e., the program counter identifiers) are inserted into an incomplete graph, after which each placeholder is resolved and replaced with a respective definition and usage node identifier to produce a corresponding cross-chain edge. However, alternative implementations are possible, in which placeholders are not used. In such implementations, cross-chain edges may be appended to the incomplete graph based on information contained in the incomplete graph and/or the execution trace used to generate the incomplete graph.

In the examples of FIGS. 1-7, a respective execution trace section is provided to a different processing unit, and each of the processing units is used to generate a definition-and-usage chain based on the provided execution trace section. However, alternative implementations are possible in which refer execution trace sections are provided to different cores on the same processing unit. For example, in some implementations, an execution trace may be divided into as many sections as there are processor cores available to generate definition-and-usage chains, and each of the cores may be used to generate a different definition-and-usage chain based on the provided execution trace section. In this regard, the term "processor" as used throughout the present disclosure may refer to either a particular hardware processing unit, such as an ARM or x86 processor, or a particular core within a hardware processing unit.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

The invention claimed is:

1. A method for data flow analysis, comprising:
obtaining, by a processing circuitry, an execution trace of a software program;
dividing, by the processing circuitry, the execution trace into a plurality of sections, each section identifying a sequence of instructions of the software program;
generating a plurality of definition-and-usage chains, at least some of the definition-and-usage chain being generated by different processors, at least some of the definition-and-usage chains being generated based on different sections of the execution trace, at least two of the definition-and-usage chains being generated in parallel with one another;

combining, by the processing circuitry, the plurality of definition-and-usage chains to produce a data flow graph, the definition-and-usage chains being combined based on information provided by at least one of the processors that are used to generate the definition-and-usage chains, the information indicating one or more unresolved memory locations that are accessed by respective operations corresponding to one or more incomplete usage nodes in the definition-and-usage chains; and providing, by the processing circuitry, the data flow graph for further use in detecting vulnerabilities in the software program, wherein any of the unresolved memory locations includes a memory location that is assigned a definition that is at least one of (A) produced by a first operation identified in one of the sections of the execution trace, and retrieved by a second operation identified in another one of the sections of the execution trace or (B) produced by a first operation corresponding to a first node in one of the definition-and-usage chains and retrieved by a second operation corresponding to a second node in another one of the definition-and-usage chains.

2. The method of claim 1, wherein combining the plurality of definition-and-usage chains includes generating one or more cross-chain edges, each of the cross-chain edges connecting a first node in one of the definition-and-usage chains to a second node in another one of the definition-and-usage chains.

3. The method of claim 1, wherein combining the plurality of definition-and-usage chains includes generating a data structure that includes a plurality of placeholders for nodes in any of the definition-and-usage chains and resolving each of the placeholders by replacing the placeholder with an identifier of a corresponding node in one of the definition-and-usage chains.

4. The method of claim 1, wherein any of the incomplete usage nodes includes a first node in a first one of the definition-and-usage chains, the first node corresponding to a first operation that has retrieved a definition generated by a second operation corresponding to a second node in a second one of the definition-and-usage chains.

5. The method of claim 1, wherein:
any of the unresolved memory locations includes one of a location in random-access memory (RAM) or a memory register;
any of the definition-and-usage chains includes a connected directed acyclic graph,
the data flow graph includes a disconnected directed acyclic graph, and
providing the data flow graph includes one of storing the data flow graph in a memory or transmitting the data flow graph over a communications network.

6. A system comprising:
a memory; and
a processing circuitry operatively coupled to the memory, the processing circuitry being configured to perform the operations of:
obtaining an execution trace of a software program;
dividing the execution trace into a plurality of sections, each section identifying a sequence of instructions of the software program;
generating a plurality of definition-and-usage chains, at least some of the definition-and-usage chain being generated by a different processor, at least some of the definition-and-usage chains being generated based on different sections of the execution trace, at least two of the definition-and-usage chains being generated in parallel with one another;
combining the plurality of definition-and-usage chains to produce a data flow graph, the definition-and-usage chains being combined based on information provided by at least one of the processors that are used to generate the definition-and-usage chains, the information indicating one or more unresolved memory locations that are accessed by respective operations corresponding to one or more incomplete usage nodes in the definition-and-usage chains; and
providing the data flow graph for further use in detecting vulnerabilities in the software program,
wherein any of the unresolved memory locations includes a memory location that is assigned a definition that is at least one of (A) produced by a first operation identified in one of the sections of the execution trace, and retrieved by a second operation identified in another one of the sections of the execution trace or (B) produced by a first operation corresponding to a first node in one of the definition-and-usage chains and retrieved by a second operation corresponding to a second node in another one of the definition-and-usage chains.

7. The system of claim 6, wherein combining the plurality of definition-and-usage chains includes generating one or more cross-chain edges, each of the cross-chain edges connecting a first node in one of the definition-and-usage chains to a second node in another one of the definition-and-usage chains.

8. The system of claim 6, wherein combining the plurality of definition-and-usage chains includes generating a data structure that includes a plurality of placeholders for nodes in any of the definition-and-usage chains and resolving each of the placeholders by replacing the placeholder with an identifier of a corresponding node in one of the definition-and-usage chains.

9. The system of claim 6, wherein any of the incomplete usage nodes includes a first node in a first one of the definition-and-usage chains, the first node corresponding to a first operation that has retrieved a definition generated by a second operation corresponding to a second node in a second one of the definition-and-usage chains.

10. The system of claim 6, wherein:
any of the unresolved memory locations includes one of a location in random-access memory (RAM) or a memory register;
any of the definition-and-usage chains includes a connected directed acyclic graph,
the data flow graph includes a disconnected directed acyclic graph,
the system includes a computing cluster, and
providing the data flow graph includes one of storing the data flow graph in a memory or transmitting the data flow graph over a communications network.

11. A non-transitory computer-readable medium storing one or more processor-executable instructions, which when executed by at least one processor cause the at least one processor to perform the operations of:
obtaining an execution trace of a software program;
dividing the execution trace into a plurality of sections, each section identifying a sequence of instructions of the software program;
generating a plurality of definition-and-usage chains, at least some of the definition-and-usage chain being generated by different processors, at least some of the definition-and-usage chains being generated based on different sections of the execution trace, at least two of the definition-and-usage chains being generated in parallel with one another;

combining the plurality of definition-and-usage chains to produce a data flow graph, the definition-and-usage chains being combined based on information provided by at least one of the processors that are used to generate the definition-and-usage chains, the information indicating one or more unresolved memory locations that are accessed by respective operations corresponding to one or more incomplete usage nodes in the definition-and-usage chains; and providing the data flow graph for further use in detecting vulnerabilities in the software program, wherein any of the unresolved memory locations includes a memory location that is assigned a definition that is at least one of (A) produced by a first operation identified in one of the sections of the execution trace, and retrieved by a second operation identified in another one of the sections of the execution trace or (B) produced by a first operation corresponding to a first node in one of the definition-and-usage chains and retrieved by a second operation corresponding to a second node in another one of the definition-and-usage chains.

12. The non-transitory computer-readable medium of claim 11, wherein combining the plurality of definition-and-usage chains includes generating one or more cross-chain edges, each of the cross-chain edges connecting a first node in one of the definition-and-usage chains to a second node in another one of the definition-and-usage chains.

13. The non-transitory computer-readable medium of claim 11, wherein combining the plurality of definition-and-usage chains includes generating a data structure that includes a plurality of placeholders for nodes in any of the definition-and-usage chains and resolving each of the placeholders by replacing the placeholder with an identifier of a corresponding node in one of the definition-and-usage chains.

14. The non-transitory computer-readable medium of claim 11, wherein any of the incomplete usage nodes includes a first node in a first one of the definition-and-usage chains, the first node corresponding to a first operation that has retrieved a definition generated by a second operation corresponding to a second node in a second one of the definition-and-usage chains.

* * * * *